United States Patent [19]

Brinck, II

[11] Patent Number: 5,271,161

[45] Date of Patent: Dec. 21, 1993

[54] METHOD AND APPARATUS FOR ROASTING BARRELS

[76] Inventor: Joseph A. Brinck, II, 5521 Bross Ct., Cincinnati, Ohio 45238

[21] Appl. No.: 840,840

[22] Filed: Feb. 25, 1992

[51] Int. Cl.$^5$ .............................................. F26B 7/00
[52] U.S. Cl. .......................................... 34/21; 34/105; 34/231; 34/219
[58] Field of Search .................. 34/44, 104, 105, 218, 34/219, 21, 22, 231, 54, 216, 217, 12

[56] References Cited

U.S. PATENT DOCUMENTS

| | | | |
|---|---|---|---|
| 282,814 | 8/1883 | Weidmann | 34/104 |
| 701,822 | 6/1902 | Vogel | 34/105 |
| 1,839,628 | 1/1932 | Williams | 34/105 |
| 2,140,841 | 12/1938 | Leonard et al. | 34/105 |
| 2,509,396 | 5/1950 | Mayer | 34/104 |
| 2,891,319 | 6/1959 | Beyvl | 34/104 |
| 3,726,020 | 4/1973 | Lee, Jr. | 34/105 |
| 3,729,832 | 5/1973 | Lund | 34/105 |
| 3,842,723 | 10/1974 | Boucher | 99/277.1 |
| 4,053,993 | 10/1977 | Schregenberger | 34/105 |
| 4,484,688 | 11/1984 | Smith | 217/91 |
| 4,492,571 | 1/1985 | Miura | 34/105 |

Primary Examiner—Henry A. Bennet
Assistant Examiner—Denise L. Gromada
Attorney, Agent, or Firm—Wood, Herron & Evans

[57] ABSTRACT

A method and apparatus for roasting barrels used in aging alcoholic spirits involves directing a heated air stream through the inside of the barrel at a predetermined temperature for a predetermined duration. Compared to prior methods and apparatus which utilize direct flame impingement and often result in nonuniform roasting and undesired burning of the barrel staves, a heated air stream produces uniform roasting of the entire inside surface of the barrel. An indexable conveyor adapted to hold a plurality of barrels moves each barrel into alignment with an outlet. A stream of heated air flowed from the outlet enters an open end of the aligned barrel. A diverter plate located at the other end of the barrel partially impedes outflow of the stream, thereby increasing residence time of the air to uniformly roast the inside surface. The diverter plate mounts to an exhaust hood which may be moved toward and away from the ends of the barrels, thereby to permit movement of the conveyor into alignment with, and adjacent to, the ends of the barrels during roasting.

23 Claims, 2 Drawing Sheets

METHOD AND APPARATUS FOR ROASTING BARRELS

FIELD OF THE INVENTION

This invention relates to barrel roasting. More particularly, this invention relates to roasting the inside surfaces of barrels used in aging alcoholic spirits.

BACKGROUND OF THE INVENTION

The production of alcoholic spirits involves an aging step. During the aging step, wooden barrels hold the alcohol spirits, and the wood imparts a distinct flavor to the spirits. Colder temperatures at night cause the pores of the wooden barrels to close, and higher temperatures during day cause the pores to open. Over a period of years, the opening and closing of the pores of the wooden barrels circulates the spirits in and out of the barrel wood. The barrel during toasting is impregnated with aromatic aldehydes which impart flavor to the spirits during this circulation or breathing process. For scotch whiskey, aging may last up to twelve or even eighteen years. Some barrels may be reused. In the production of bourbon and wine, a barrel may only be used once.

The distinctive flavor imparted to spirits during aging results from the wood itself and pre-treatment of the inside surfaces of the barrels during manufacture. This pretreatment includes at least two steps. The first step involves manufacturing the barrels in a steam tunnel to increase the moisture content of the wooden staves which form the barrel. The increased moisture content facilitates longitudinal bending of the staves, which is required to form a barrel shape. Once manufactured, the inside surfaces of the barrels must be roasted. The moisture content helps reduce burning during roasting.

Current barrel roasters utilize direct flame impingement upon the inside surface of the barrel. This is accomplished by indexing each barrel over an upwardly directed gas burner. The flame from the burner enters one open end of the barrel and exits at the other end of the barrel. Most barrel roasting of this type last for about fourteen minutes, with the flame set for a temperature of about at least 2,000° F.

This method of roasting barrel suffers from a number of disadvantages. Primarily, the use of direct flame impingement upon the inside surfaces of the barrel produces nonuniform roasting from top to bottom. Because the flame is closest to the bottom, the bottom end of the barrel may become burnt while the top end may be insufficiently roasted. The desired result for aging is a uniform roast. Sometimes roasting is referred to as charring or toasting of the wood. In the context of this application, the word "char" is equivalent to the word "roast," and it does not refer to burning or blackening of the staves due to too much roasting.

In addition to nonuniformity, roasting by direct flame impingement commonly produces inconsistencies from barrel to barrel. While inconsistency from barrel to barrel may be correctable by controlling the flame, this has not occurred in practice, perhaps due to the expense involved. Additionally, flame control will not solve the problem of nonuniform roasting.

Finally, the use of a direct flame which can extend up to two feet beyond the top end of the barrel represents a substantial energy expense, particularly in view of the other deficiencies associated with this method.

The traditional nature of the spirit manufacturing industry has tended to discourage the changing or modification of prior methods for roasting the inside surfaces of aging barrels.

Nevertheless, it is an objective of this invention to increase uniform consistency in roasting the inside surfaces of barrels used in aging alcoholic of spirits.

It is another objective of this invention to reduce the energy costs of uniformly roasting the inside surface of a barrel used for aging alcoholic spirits.

The objectives of the invention are met by directing a stream of heated air through the barrel for a sufficient time duration to uniformly roast the entire inside surface of the barrel. The heated air should have a temperature in the range of about 650° F. to 750° F. The time duration for heating the barrel should be about fourteen minutes, although this time duration could probably be lowered.

Unlike direct flame impingement, a stream of heated air does not produce burning of the staves at one end of the barrel and insufficient roasting at the other end of the barrel. The use of a controlled stream of heated air provides uniformity in the roasted char along the length of the barrel.

Additionally, because the degree of certainty with which a direct stream of heated air can be controlled, the use of heated air stream results in consistent roasting from barrel to barrel. This factor is critical to the whiskey and wine industry, where uniformity in the quality of the final product is essential.

In one manner of forming the method of this invention, the heated stream of air may be directed into one, open end of the barrel from a conduit outlet. A deflector at an opposite end of the barrel partially impedes outflow of the stream from the barrel. This increases the residence time of the heated air stream within the barrel and produces more efficient and uniform roasting. If desired, steam may be injected into the air stream prior to outflow from the conduit. This step may be used to reduce the moisture loss of the barrels during roasting.

In a preferred embodiment of the invention, a barrel roasting apparatus simultaneously roasts the inside surfaces of a plurality of barrels. The apparatus includes a conveyor, a blower communicating with an air conduit, a gas burner located within the conduit, a plurality of conduit outlets located below the conveyor, a vertically movable exhaust hood located above the conveyor and a plurality of deflectors mounted to the exhaust hood.

The conveyor supports and moves the plurality of barrels horizontally into alignment with the plurality of outlets. The exhaust hood moves downwardly toward the barrels to place the deflectors at the top ends of the barrels. In this position, each barrel has an outlet directed into its open bottom end and a deflector located at its top end. The gas burner heats an air stream forced through the conduit by the blower. The heated air stream flows upwardly from the outlets and into the bottom ends of the barrels for a predetermined time duration. The deflectors at the top ends of the barrels partially impede outflow to increase the residence time of the air within the barrels and produce uniform roasting. After flowing through perforations in the deflectors or out the bottom of the barrel, the exhaust hood recovers the heated air and returns it to the conduit.

A steam injector may be located in the conduit between the gas burner and the outlets. Injecting steam into the heated air stream will reduce the moisture loss of the barrels during roasting.

After a predetermined time duration which sufficiently and uniformly roasts the entire inside surfaces of the barrels, the hood is moved upwardly and the conveyor moves a batch of roasted barrels away from the outlet and moves an unroasted batch of barrels into alignment with the outlets.

To eliminate the need to turn off the blower and the gas burner each time a roasted batch of barrels is conveyed away from the outlets and a new batch of barrels is conveyed to the outlets, the apparatus may include a bypass line which bypasses the conduits and the exhaust hood. The bypass line and each of the outlets is preferably equipped with a damper. A controller may be used to coordinate simultaneous opening of the dampers in the outlet lines and closing of the damper in the bypass line when a batch of barrels are in position between the outlets and the deflectors and ready to be roasted. Thereafter, when the barrels have been roasted for a predetermined duration, the controller simultaneously closes the dampers to the outlets and opens the damper to the bypass line.

The exhaust hood reclaims most of the heated air stream for recirculation. Also, fresh air at the inlet may be preheated by heat recovered from the exhaust air, via a fume incinerator. Compared to prior direct flame impingement roasters, this apparatus significantly reduces the total amount of energy expended in roasting barrels for use in aging whiskey and wine.

By controlling and/or varying parameters of the roasting operation such as steam injection, temperature, flow rate, pressure and duration of roasting, batches of barrels may be roasted in a manner which produces particular characteristics which are desirable because they impart a distinct flavor to a whiskey or a wine. It is believed that these parameters may be controlled to produce barrels with char characteristics which simulate the particular char characteristics common to barrels produced in various wine growing regions of France, but at a substantially lower cost.

These and other features of the invention will be more readily understood in view of the following detailed description and the drawings.

DETAILED DESCRIPTION OF THE DRAWINGS

Figure 1:
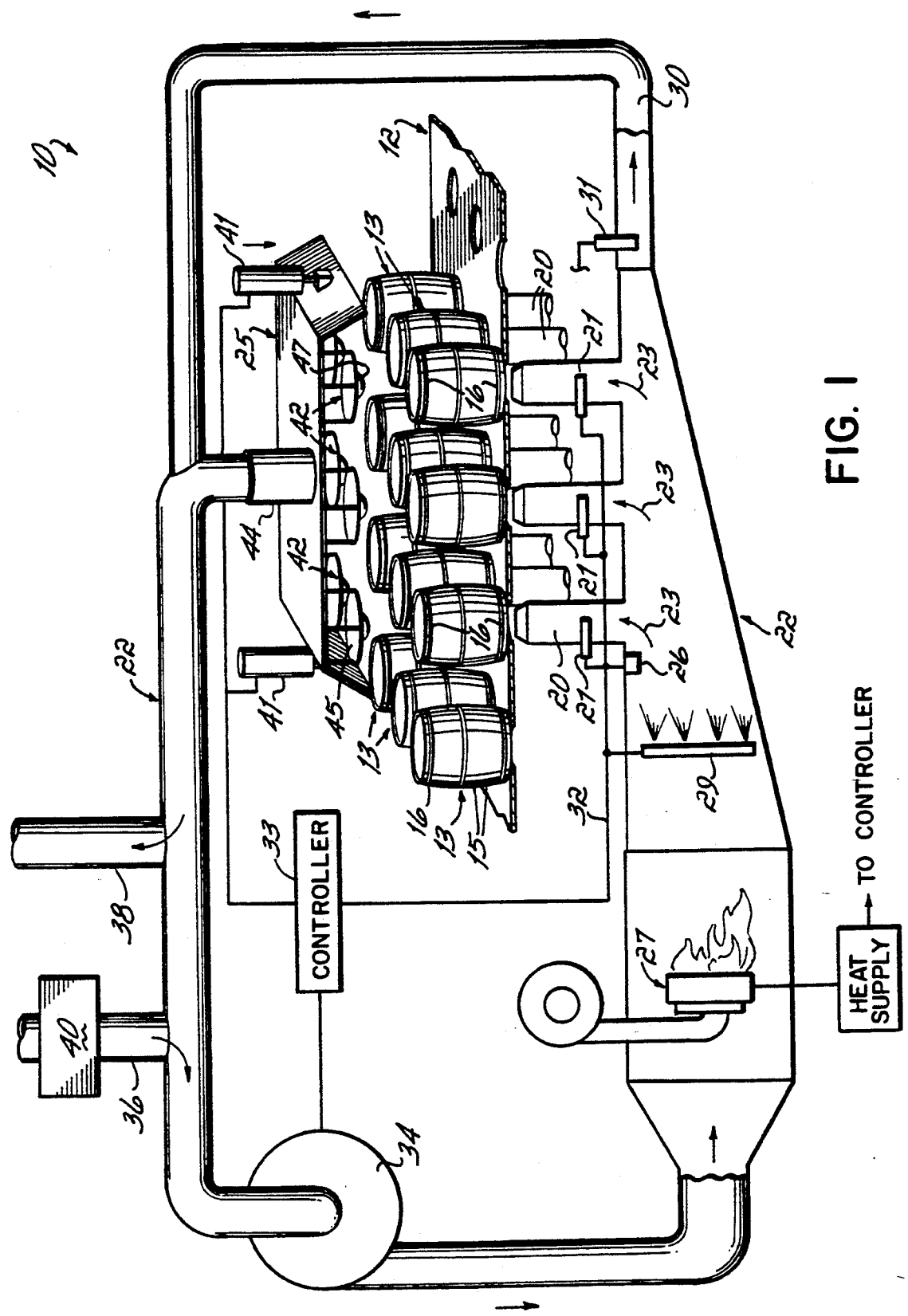
FIG. 1 is a schematic view showing a plurality of barrels, in perspective, in a barrel roaster in accordance with a preferred embodiment of the invention.

FIG. 1 schematically shows a barrel roasting apparatus 10 in accordance with a preferred embodiment of the invention. The apparatus 10 includes a conveyor 12 which moves a plurality of barrels 13 in a horizontal direction. Conveyor 12 has openings with which the barrels 13 are aligned when placed thereon. Alternatively, conveyor 12 may be a mesh screen, with markings to indicate locations for placement of the barrels 13. As another alternative, conveyor 12 may be vertically oriented, with hooks for holding the sides of the barrels 13 in position, similar to devices used in the logging industry.

Each of the barrels 13 includes a plurality of wooden staves 15 which are oriented vertically when the barrel 13 is standing upright, on one of its ends. The staves are usually of white oak, due to the distinct flavor which this type of wood imparts to whiskey or wine during aging. The staves 15 are supported exteriorly by at least two steel rings 16.

The conveyor 12 indexes a plurality of barrels 13 into alignment with a plurality of outlets 20, with each barrel 13 located above one outlet 20. Each outlet 20 directs a stream of heated air into an open bottom end of a barrel 13 supported on the conveyor 12 thereabove. Outflow from each outlet 20 is controlled by a damper 21. The outlets 20 communicate with a conduit which is designated generally by reference numeral 22. Directional arrows 23 show the flow path of the heated air stream through the conduit 22 and into the outlets 20. Above conveyor 12, a vertically movable exhaust hood 25 recovers the heated air streams which flow out from the top ends of the barrels 13. From the exhaust hood 25, the heated air returns to the conduit 22 for recirculation.

A heat source 27 located upstream of the outlets 20 heats the air flowing through the conduit 22 to a desired temperature. The heat source 27 is preferably a gas burner, with a combustion blower. Alternatively, the air stream may be heated by electrical heat, a steam coil or a heat transfer coil. Any manner of heating the air stream to the desired temperature would be sufficient. However, it is believed that the use of a gas burner is the most energy efficient of these methods.

Preferably, a steam injector 29 is located between the heat source 27 and the outlets 20. The steam injector 29 may be used to inject steam into the heated air stream to reduce moisture loss of the barrels 13 during the roasting. The steam injector 29 enables the moisture content of the roasted barrels to be controlled for proper aging, or for desired char characteristics. A sensor 26 in conduit 22 may be used to measure moisture in the heated air stream.

The apparatus 10 preferably includes a bypass line 30 which bypasses the outlets 20, the conveyor 12 and the exhaust hood 25. A damper 31 controls flow through bypass line 30. The bypass line 30 enables the other components of the apparatus 10, including the gas burner 27, to be operated continuously when a conveyor 12 moves a batch of roasted barrels 13 away from the outlets 20 and a batch of barrels 13 to be roasted into alignment with the outlets 20.

During indexing of the conveyor 12 to move a plurality of barrels 13 into alignment with the outlet, and until the exhaust hood 25 moves downwardly into alignment with the barrels 13, the damper 31 remains open so that the heated air stream flows through bypass line 30. At the same time, the dampers 21 remain closed to prevent outflow of the heated air stream from the outlets 20. When the barrels 13 are ready to be roasted, the dampers 21 are opened and damper 31 is simultaneously closed. Preferably, a controller 33 controls the timed opening and closing of the dampers 21 and damper 31 according to a desired sequence. If desired, the controller 33 may independently control each damper 21, if the conveyor is not operating at full capacity. FIG. 1 schematically shows a control line 32, which may be an electrical conduit, for routing the various control leads to the controller 33.

Upstream of the gas source 27, a recirculation blower 34 forces air through the conduit 22 in the desired direction. Preferably, the blower 34 provides air flow through the conduit 22 at a flow rate and pressure which provide desired flow rate and a pressure parameters at the outlets 20. Presently, it is believed that the flow rate of the air stream from each outlet 20 into the bottom end of a barrel 13 should be about 1,500 scfm and at a pressure of about 5" water column.

Upstream of the blower 34, a fresh air inlet 36 allows fresh, make up air to be added. An exhaust flow outlet 38 allows air to be exhausted to atmosphere. Because the heated air stream will include some airborne particulate and volatile organic compounds, the exhaust flow outlet 38 will most likely include a fume incinerator (not shown). Waste heat recovered from the fume incinerator (not shown) may be used to preheat the intake air via a waste heat recovery unit 40 located along the intake air inlet 36.

FIG. 1 shows a plurality of barrels 13 supported on the conveyor 12 and in alignment with a plurality of outlets 20 below and a plurality of deflectors 42 which are mounted to the exhaust hood 25 located thereabove. As indicated previously, the exhaust hood 25 is vertically movable, via at least one hydraulic piston 41, to a raised position to permit unimpeded horizontal movement of the conveyor 12 to align the barrels 13 with the outlets 20. The hood 25 may be slidable via an oversized sleeve 44. Exhaust hood 25 then moves downwardly to position the plurality of aligned deflectors 42 at the top ends of the barrels 13. The deflectors 42 cover the top ends of the barrels 13 during roasting and impede outward flow of the heated air stream. This increases the residence time of the heated air stream in the barrels 13. This deflection also forces the air stream into contact with the entire inside surface of the barrel 13, thereby producing uniform roasting along the entire lengths of the staves 15.

Figure 2:
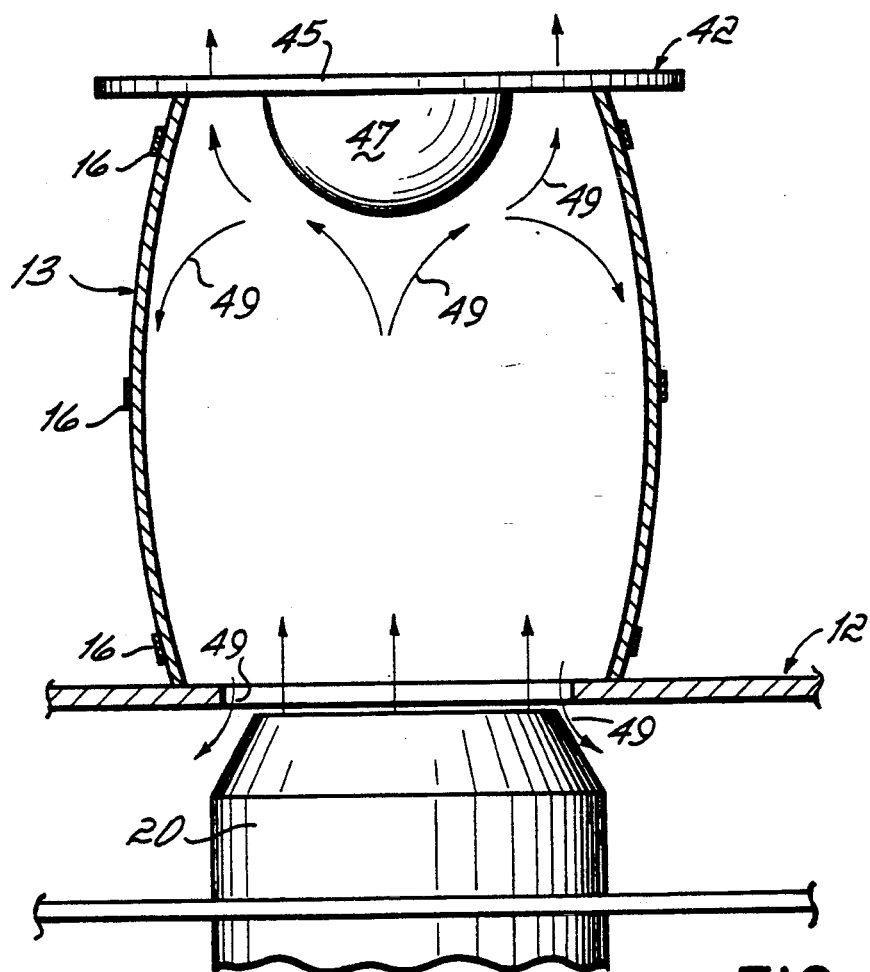
FIG. 2 is an enlarged, cross-sectional view of a barrel during roasting in accordance with a preferred embodiment of the invention.
Figure 3:
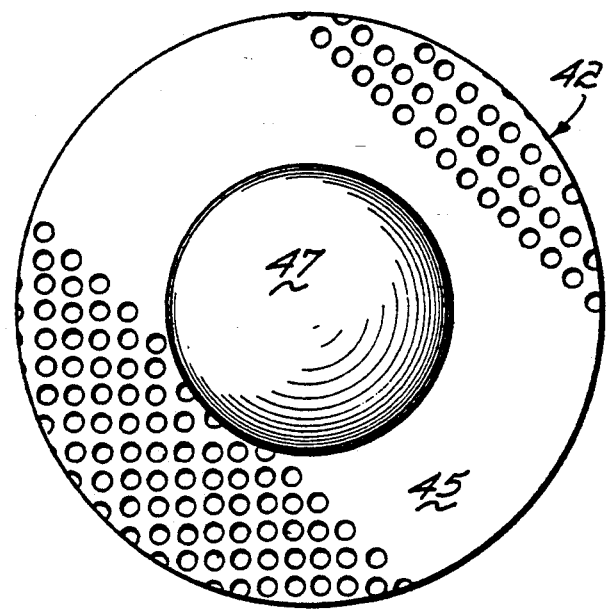
FIG. 3 is a plan view of a deflector used in one contemplated embodiment of the invention.

FIG. 2 more clearly shows a deflector 42 at the top end of a barrel 13 and the air flow paths inside the barrel 13 during roasting. In one contemplated embodiment, the deflector 42 includes a round, flat perforated plate 45 of a diameter which is greater than that of the barrel 13. The plate 45 has a thickness suitable to withstand the heat and also has uniformly spaced perforations, as shown in FIG. 3. Each deflector 42 also includes a nonperforated, semi-spherical bowl or dome 47 mounted centrally to a bottom surface of the respective plate 45. The domes 47 may be mounted to the plates 45 by welding. The dome 47 deflects the heated air stream radially outwardly toward the tops of the staves 15, along the staves 15 and then out the bottom of the barrel 13, as shown by directional arrows 49.

In operation, a plurality of barrels 13 are placed on the conveyor 12. The conveyor 12 indexes a first batch of the barrels 13 into alignment with the outlets 20. The exhaust hood 25 then moves downwardly to locate and align the deflectors 42 at the top ends of the barrels 13. Controller 33 opens the dampers 21 and closes damper 31 to direct heated air streams from the outlets 20 and into the barrels 13. Heated air passes through the barrels 13 to uniformly roast the inside surfaces thereof, and the air is eventually collected by the exhaust hood 25. After a predetermined time duration for roasting, the controller 33 opens damper 31 and closes dampers 21. Exhaust hood 25 then moves upwardly, and the conveyor 12 moves the roasted batch of barrels away from the outlets 20. Conveyor 12 then moves a new batch of barrels 13 into alignment with the outlet 20, and the cycle begins again.

As indicated previously, the barrels 13 are roasted by the heated air stream at a temperature which is preferably in the range of about 650° F. to 750° F. and for a duration of about fourteen minutes. However, it is to be understood that this invention is not to be limited by these particular parameters.

Finally, because aromatic aldehydes are responsible for the taste of distilled spirits, it would be of great advantage to increase the concentration of these compounds in the wood of the barrel. Aromatic aldehyde compounds are produced by the incomplete combustion of the wood, and through the combining of natural aldehydes present therein with carbon rings formed during the charring of the wood. It is known that "cold" combustion of natural gas fuel will produce high concentrations of aldehydes. By measuring aldehyde presence in a heated air stream, and comparing the measured value to the rate of "cold" air recirculated directly into the flame, it would be possible to produce higher concentrations of aldehydes in the heated air stream and thereby increase the amount of aromatic aldehydes present in the charred barrels. Ultimately, with higher concentrations of aromatic aldehydes, distilling time may be reduced and enormous amounts of money saved, compared to distilling with conventional, direct flame roasted barrels.

The invention also contemplates varying other parameters such as flow rate, pressure, temperature, steam injection and duration of roasting to achieve a variety of different, desirable char characteristics for the roasted barrels. By comparing char characteristics presently obtained by direct flame impingement for barrels currently used to produce specific types of wine and whiskey, or for barrels commonly produced by particular spirit-producing regions of the world, a heated air stream may be controlled via manipulation of the above-stated parameters to roast barrels having identical char characteristics, but at a significantly lower cost. As a result, wines and whiskeys having the same distinct flavor may be produced at a lower cost.

Finally, because aromatic aldehydes are responsible for the taste of distilled spirits, it would be of great advantage to increase the concentration of these compounds in the wood of the barrel. Aromatic aldehyde compounds are produced by the incomplete combustion of the wood, and through the combining of natural aldehydes present therein with carbon rings formed during the charging of the wood. It is known that "cold" combustion of natural gas fuel will produce high concentrations of aldehydes. By measuring aldehyde presence in a heated air stream, compressed to the rate of "cold" air recirculated and directly into the flame, it would be possible to produce higher concentrations of aldehydes in the heated air stream and thereby increase the amount of aromatic aldehydes present in the charred barrels. Ultimately, with higher concentrations of aromatic aldehydes, distilling time may be reduced and enormous amounts of money saved, compared to distilling with conventional direct flame roaster barrels.

While a preferred embodiment of the invention has been described, it is to be understood that this invention is not limited thereby and that in light of the present disclosure, various additional embodiments of this method and apparatus will be apparent to one of ordinary skill in the art without departing from the scope of the invention. Accordingly, applicant tends to be bound only by the following claims.

I claim:

1. A method of rotating the inside surface of a wooden barrel used in aging alcoholic spirits comprising the steps of:
   providing an already formed and dried barrel of curved wooden staves held together by at least one ring; and
   directing a stream of heated air through the barrel to uniformly roast the entire inside surface of the wooden barrel but not the outside surface, thereby to form a layer of aromatic aldehydes on said inside surface for enhancing the flavor of spirits aged in the barrel.

2. The method of claim 1 wherein the stream of heated air is directed into the barrel via a first end, and further comprising the step of:
   partially impeding outflow of the heated air from a second end of the barrel, thereby to increase the residence time of the heated air in the barrel to enhance the uniformity of rotating.

3. The method of claim 2 wherein heated air flow is impeded by a perforated plate.

4. The method of claim 1 wherein the stream is heated to a temperature in the range of about 650° F. to 750° F.

5. The method of claim 1 wherein the stream is directed through the barrel for a duration of about fourteen minutes.

6. The method of claim 1 wherein the stream of heated air is directed through the barrel at a flow rate of about 1,500 standard cubic feet per minute.

7. The method of claim 1 wherein the pressure of the directed stream is in the range of about 5" water column.

8. The method of claim 1 wherein the heated air is directed out of an outlet located at the end of a conduit and further comprising the step of:
   injecting steam into the stream inside of the conduit and prior to the directing step.

9. The method of claim 1 and further comprising the step of:
   controlling one or more of the parameters of the air stream, including temperature, flow rate, duration of roasting, pressure, aldehyde concentration and moisture content, thereby to produce a barrel having a particular char characteristic.

10. A barrel roaster for roasting the inside surface of an already formed and dried wooden barrel used in aging alcoholic spirits comprising:
    means for generating a stream of heated air;
    a conduit in communication with the generating means and having an outlet for flowing the stream outwardly therefrom;
    means for moving a wooden barrel into alignment with the outlet, thereby to direct the flowed stream through the barrel to uniformly roast the inside surface but not the outside surface of the barrel; and
    means for partially impeding outflow of the heated air from a second end of the barrel, thereby to increase the residence time of the heated air in the barrel to enhance the uniformity of roasting.

11. A barrel roaster for roasting the inside surface of an already formed and dried wooded barrel used in aging alcoholic spirits comprising:
    means for generating a stream of heated air;
    a conduit in communication with the generating means and having an outlet for flowing the stream outwardly therefrom;
    means for moving a wooden barrel into alignment with the outlet, thereby to direct the flowed stream through the barrel to uniformly roast the inside surface but not the outside surface of the barrel, wherein the moving means positions a first end of the barrel adjacent to the outlet; and
    exhaust means movable to and from a second end of the barrel, opposite the first, when the barrel is aligned with the top outlet, thereby to capture and recirculate heated air leaving the barrel during roasting.

12. The barrel roaster of claim 11 and further comprising:
    a deflector mounted to the exhaust means and movable therewith to a second end of the barrel, opposite the first end, to partially impede flow of the heated air stream out of the second end during roasting.

13. The barrel roaster of claim 12 wherein the deflector further comprises:
    a perforated plate; and
    a semi-spherical dome attached to the plate and projecting into the barrel.

14. The barrel roaster of claim 12 wherein the moving means moves the barrels horizontally, the outlets are located below bottom ends of the barrels and the exhaust means moves the deflectors into top ends of the barrels.

15. The barrel roaster of claim 10 and further comprising:
    means for injecting steam into the stream of heated air, thereby to control the moisture content of the barrels.

16. The barrel roaster of claim 10 and further comprising:
    a bypass line to route the heated air stream away from the conduit and the exhaust means and directly to a recirculating means when a barrel is not aligned with the outlet.

17. The barrel roaster of claim 16 and further comprising:
    a controller operatively connected to the outlet and the bypass line to control routing of the heated air stream.

18. A barrel roaster comprising:
    a conveyor adapted to support and move a plurality of barrels into a roasting position;
    a plurality of outlets aligned with first ends of the barrels at the roasting position;
    a conduit in communication with the outlets;
    means for generating a heated air stream within the conduit for outward flow from the outlets and into barrels located in the roasting position; and
    an exhaust hood having a plurality of deflectors aligned with the plurality of outlets, the exhaust hood adapted to recover some of the heated air stream flowed outwardly from the outlets for recirculation, the exhaust hood being movable to position the deflectors at second ends of the barrels when the barrels in the roasting position, whereby barrels moved into the roasting position and between the outlets and the deflectors may be uniformly roasted by heated air directed out of the outlets and through the barrels.

19. The barrel roaster of claim 18 and further comprising:
    means for injecting steam into the heated stream to control moisture content of the barrel.

20. The barrel roaster of claim 19 and further comprising:
a bypass line for routing heated air flow away from the outlet and the exhaust hood and directly to a recirculation means when no barrels are in the roasting position.

21. The barrel roaster of claim 20 and further comprising:
a controller operatively connected to the outlets and the bypass line to control routing of the heated air stream according to a desired sequence of operation.

22. A method of roasting wooden barrels for use in aging alcoholic spirits comprising the steps of:
providing at least one already formed and dried wooden barrel of curved wooden staves encircled by at least one ring;
locating said at least one wooden barrel in a roasting position, with a first end of each of the barrels adjacent to an outlet of a conduit;
generating stream of heated air in the conduit;
positioning a deflector at a second end of each of the barrels in the roasting position; and
directing, for a predetermined duration, the heated air from each of the outlets into the first end of each barrel in the roasting position and partially blocking the directed air with the deflector positioned at the second end thereof, thereby to uniformly roast the inside surface but not the outside surface of each of the barrels.

23. The method of claim 22 and further comprising the steps of:
exhausting the heated air for recirculation as it leaves the barrels; and
selectively routing the heated air stream directly to recirculation to bypass each of the outlets, according to a desired sequence, thereby to enable continuous generation of the heated air stream during conveying of barrels to and from the roasting position.

* * * * *